April 27, 1943.                    W. C. BARNES                    2,317,721
                    METHOD AND APPARATUS FOR DETECTING FLAWS
                              Filed May 11, 1940                 2 Sheets-Sheet 2
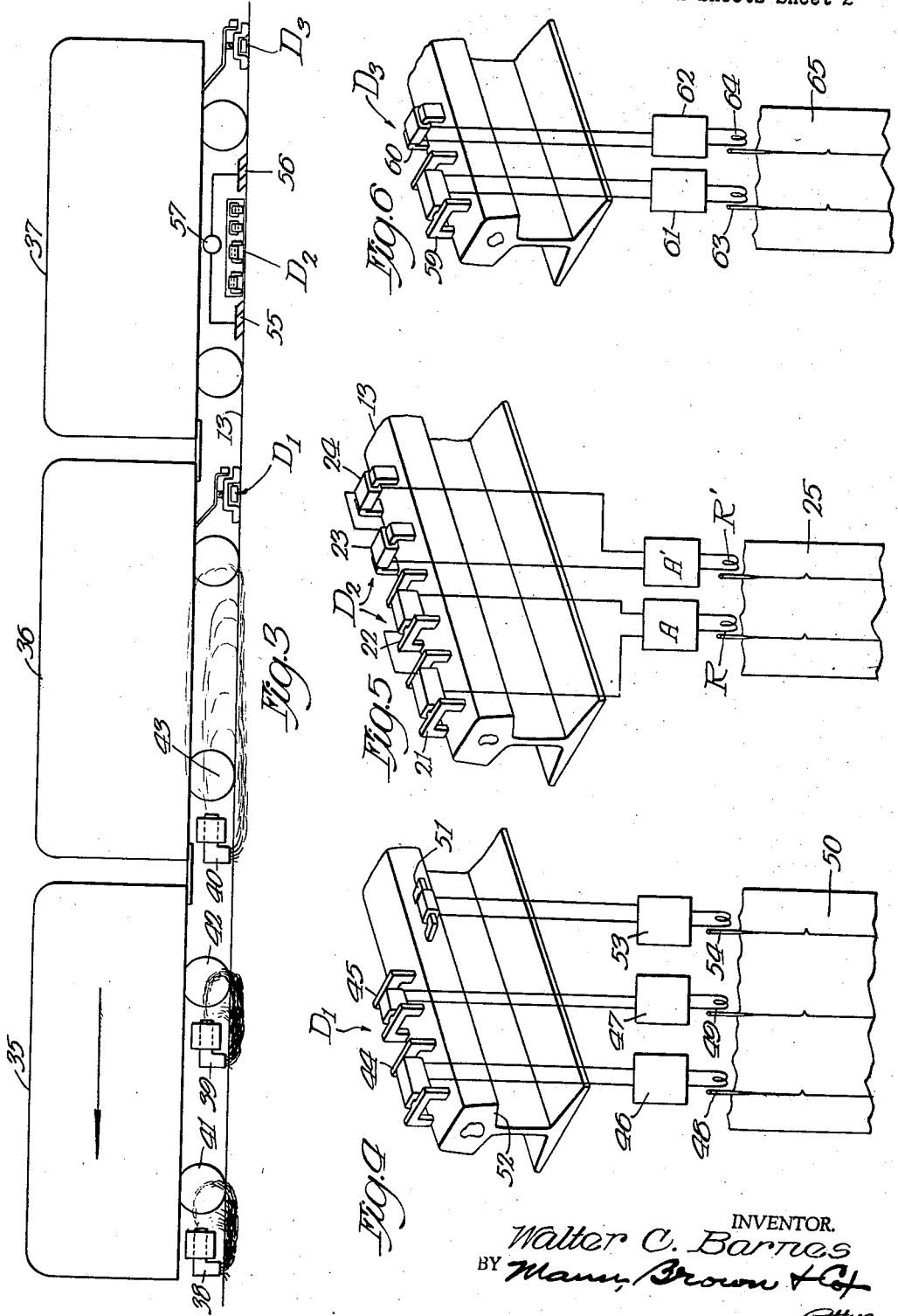
INVENTOR.
Walter C. Barnes
BY Mann, Brown & Co.
Attys.

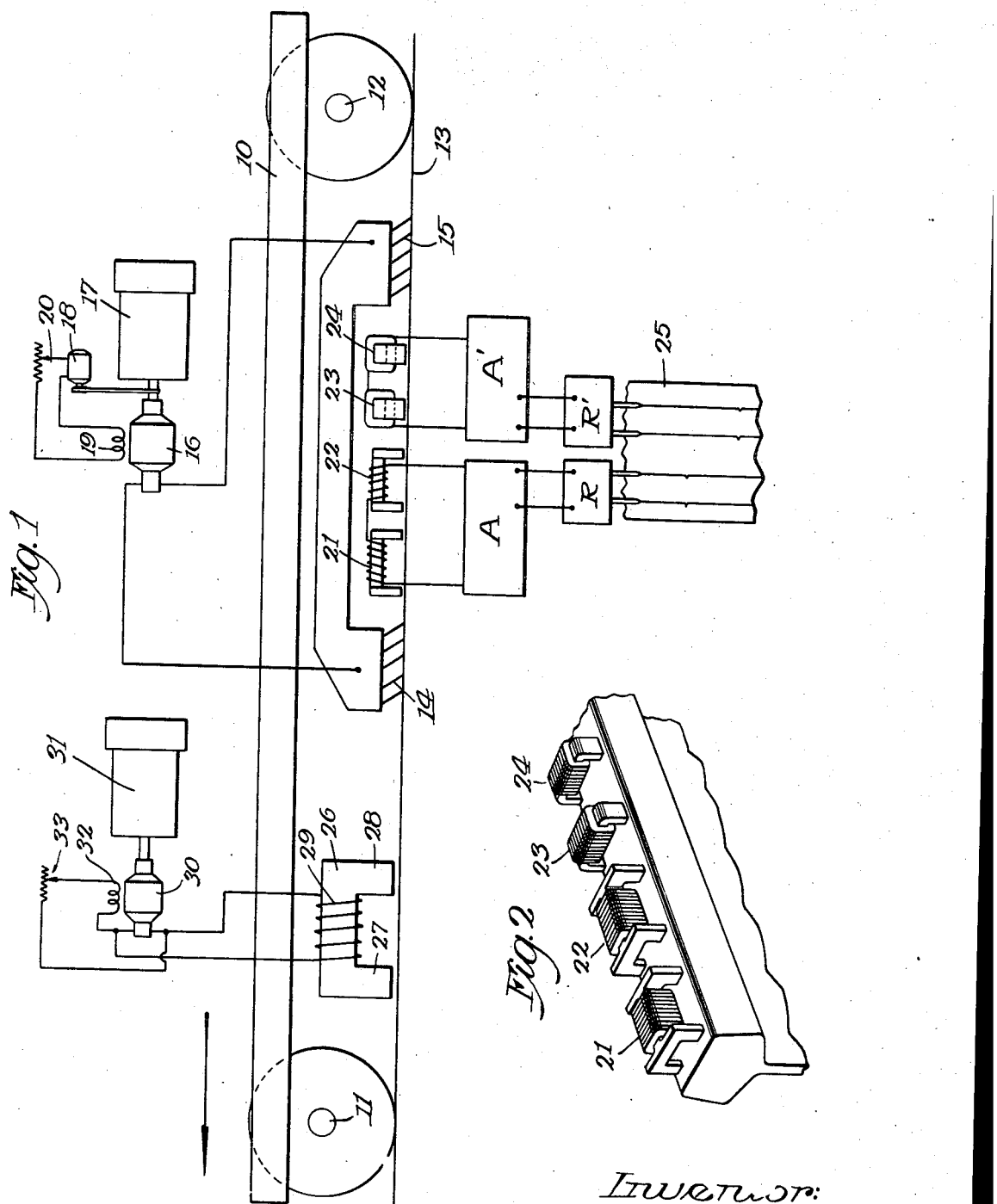

Patented Apr. 27, 1943

2,317,721

UNITED STATES PATENT OFFICE 2,317,721

METHOD AND APPARATUS FOR DETECTING FLAWS

Walter C. Barnes, Lake Bluff, Ill.

Application May 11, 1940, Serial No. 334,635

18 Claims. (Cl. 175—183)

This application is a continuation in part of my application filed November 9, 1936, Serial No. 109,815 for Method and apparatus for detecting flaws.

In the patent to Drake No. 1,944,930, issued January 30, 1934, a flaw detection method is disclosed which consists in providing an auxiliary energizing circuit (electrical or magnetic) in advance of the main detection apparatus in order "to allow time for the molecules of the rail head to align themselves with proper polarity" (page 1, lines 81–82).

To make use of the theory in Drake Patent 1,944,930, the theory of giving the molecules more time to aline themselves, it is obviously necessary that the pre-energization be substantially the same type as to direction of flux as the final energization. According to the present invention, however, a radically different pre-energization is used. In this instance, the direction of pre-energizing, or rather pre-conditioning, flux is at right angles to the direction of final flux. Instead of giving the molecules more time to aline themselves with their final disposition as in Drake 1,944,930, the pre-conditioning of the present invention alines the molecules in a direction from which it would seem to take more time to aline them with their final disposition.

There is no way of knowing how many internal fissures are present in a given rail, because there is no way of determining if a particular flaw detection method is 100 per cent efficient. It is known that the electro-inductive system of testing disclosed in Drake Patent No. 1,944,930 does fail to locate many fissures present in the rail, because tests made by a car using a different method and running over the same rail that has just been tested by the electro-inductive car have revealed the presence of fissures which were missed by the electro-inductive car.

The principal object of this invention, therefore, is to provide method and apparatus for locating flaws in track which will detect the greatest possible number of fissures that are present in the rail. The invention combines two systems of testing which through their cooperative relation detect a greater number of fissures than would be possible using either system alone. Furthermore, the total number of fissures which may be expected to be found by the method and apparatus of this invention is greater than the sum of the number of fissures that could be found by the use of either method alone.

It is known that a fissure becomes polarized when a magnetic field is passed through the metal in which the fissure occurs and theoretically the magnetic flux set up by an electrical current passed longitudinally through a rail is not in the proper direction for polarizing transverse fissures. Likewise, transverse detector coils are not theoretically as effective as longitudinal detector coils for detecting transverse fissures by the polarization of their faces.

It is a further object of this invention, therefore, to so condition the rail and so arrange the detecting units that all fissures, regardless of type, should theoretically be found.

Further and other objects and advantages will become apparent as the disclosure proceeds and the description is read in conjunction with the accompanying drawings, in which:

Fig. 1 is a diagrammatic view showing a preferred form of the invention;

Fig. 2 is a perspective view showing the arrangement of the coils over the rail head;

Fig. 3 shows a preferred arrangement of rail energizing and flaw detecting equipment;

Fig. 4 is a diagrammatic view, partly perspective, showing the preferred arrangement of coils in the detecting unit at the rear of the second car section;

Fig. 5 is a similar view showing the preferred arrangement of coils in the detecting unit between the current brushes of the third car section; and Fig. 6 is a similar view showing the preferred arrangement of the detecting coils at the rear of the third car section.

The invention may be variously modified within the scope of the appended claims, it being understood that the specific disclosure which follows is for the purpose of complying with section 4888 of the Revised Statutes.

The reference character 10 indicates the steel frame of a car or cars mounted on wheels 11 and 12 and normally traveling in the direction of the arrow (Fig. 1). The rail, diagrammatically indicated at 13, is progressively energized by relatively strong electrical current passed longitudinally through the rail between brushes 14 and 15, the current being furnished from a low voltage, high amperage generator 16 driven by a suitable prime mover 17 which also drives an exciter 18 for energizing the field 19 on the generator. The field may be controlled by a rheostat 20.

As the current passes between the brushes 14 and 15 through the rail, an electromagnetic field is set up at right angles to the line of current.

This field is more or less constant as long as the portion of the rail over which the brushes pass is homogeneous, but when a fissure is encountered, the current is deflected in such a way that the magnetic field surrounding the rail is varied. This variation in flux may be detected by suitable induction coils, two of which, 21 and 22, in the preferred embodiment of the invention, are placed longitudinally of the rail and connected in opposition, and two others of which, 23 and 24, are placed transversely of the rail and likewise connected in opposition. The output of the coils 21 and 22 may be amplified by an amplifier A and recorded on a moving paper chart 25 by a recorder R, and similarly the output from the coils 23 and 24 may be amplified by an amplifier A' and recorded by a recorder R' on chart 25. The details of the amplifier and recorder are so well known to the art that further description is unnecessary. It will be understood, however, that the principle of double amplification, as set forth in Barnes and Keevil Patent No. 2,109,455, may be employed, if desired.

Since the coils 23 and 24 are placed transversely of the rail, these coils are best adapted to detect vertical and horizontal split heads, particularly since the flux set up by the current that is being passed through the rail is in the proper direction for magnetizing the faces of a vertical split head.

The longitudinal coils 21 and 22, although in a position to detect longitudinal magnetic fields such as would exist between the faces of a transverse fissure, have nevertheless little opportunity theoretically for indicating the presence of transverse fissures since the flux set up by the energizing current is parallel to the faces of the fissure, assuming the transverse fissure to lie in a vertical plane at right angles to the longitudinal axis of the rail. Therefore, in order to make certain that the transverse fissures are properly polarized, an electromagnet 26, or a number of such magnets, is mounted on the car in advance of the current brushes 14 and 15 in such a position that a longitudinal flux is set up through the rail between the poles 27, 28 of the magnet. This will insure polarization of the faces of all transverse fissures, and will assist the coils 21 and 22 in making a proper indication of their presence.

The coils 21 and 22, while responsive to the longitudinal flux at polarized fissures, are also responsive to variations in the flux field around fissures due to the deviation of the current from its normal path when passing through a section of the rail containing a fissure.

Although the magnetic flux set up by the current which is passed through the rail has a tendency to wipe out the magnetic field set up by the magnets 26, it has been found in most cases that a sufficient amount of the longitudinal flux remains at the fissure to produce an indication, or at least strengthen the indication which is obtained when the electro-induction method is used without preconditioning of the rail.

The electromagnets 26 may be of any suitable form, but a form leaving a relatively high residual magnetism in the rail is preferred. An L-shaped core with the front pole close to the rail and the rear end remote from the rail (see Fig. 3) tends to reduce the partial demagnetization of the rail which would otherwise occur at and to the rear of the rear pole of the magnet, especially with the frame and wheels of the car made of magnetic metal. However, a U-shaped core can be used under some circumstances. The magnet 26 is energized by a coil 29 which is connected to a suitable source of direct current such as a generator 30. The generator 30 may be driven by an internal combustion engine 31, or other prime mover, and has its field 32 controlled by a rheostat 33. A permanent magnet may be used in place of the electromagnet if desired.

A preferred form of the invention is shown in Fig. 3, in which the detector car comprises three sections, 35, 36 and 37, the leading section carrying an L-shaped electromagnet 38 at the front of the car for introducing uni-directional flux longitudinally into the rail, and similar electromagnets 39 and 40 being mounted between the wheels 41 and 42 of the leading section 35, and in advance of the front wheel 43 of the intermediate section 36, respectively.

The electromagnets 38, 39 and 40 are shaped so that the magnetic flux which they introduce into the rail passes rearwardly through the rail and gradually leaves the rail without a concentration of vertical flux which would have a tendency to depolarize the fissures. Preferably, the wheel 43 behind the electromagnet 40 is made of non-magnetic material, so that the last application of magnetic flux by the electromagnets is characterized by the substantial elimination of concentrated vertical flux as the flux leaves the rail to complete the magnetic circuit through the core of the electromagnet 40. The distribution of flux by the electromagnets 38, 39 and 40 is diagrammatically indicated in Fig. 3.

The electromagnets 38, 39 and 40, by setting up strong magnetic fluxes longitudinally of the rail, tend to polarize all fissures having a transverse component. They also polarize to some extent horizontal split heads, because of the vertical flux which necessarily is present as the flux enters the rail through the downwardly extending forward legs of the electromagnetic cores.

A detecting unit, generally designated $D^1$, is mounted at the rear of the intermediate car section 36 to detect the residual magnetism in the vicinity of polarized fissures, and preferably the detecting unit $D^1$ comprises a pair of longitudinal detecting coils 44 and 45, both being of the type disclosed in Keevil Patent No. 2,089,967, but the latter preferably being somewhat shorter in overall length in order that it will be responsive to exceptionally short magnetic fields. The coils 44 and 45 are connected through amplifiers 46 and 47, respectively, to pen units 48 and 49, which are adapted to record upon a moving chart 50 all impulses that are set up by the coils 44 and 45.

Preferably also, the detecting unit $D^1$ includes a detecting coil 51, which has a core extending longitudinally of the rail and is mounted to cooperate either with the gauge side of the rail, as shown in Fig. 4, or with the under surface 52 on the gauge side of the rail. It has been found that a detector coil so positioned is not responsive to surface defects such as burns and the like. The coil 51 is connected to an amplifier 53, which operates a pen unit 54 adapted to cooperate with the chart 50.

The rail energizing and flaw detecting equipment on the car sections 35 and 36 constitute what is known as the residual magnetism system of flaw detection and most fissures, which are known to be present in a rail, may be detected by the equipment on these two car sections. There may be, however, certain types of fissures which are more readily detected by the electro-inductive system of testing and the rear car section 37 is equipped with such a system. Current brushes 55 and 56 mounted between the wheels of the car section 37 deliver a strong uni-directional electric current through the rail, the current being generated by any suitable means, such, for example, as the direct current generator diagrammatically indicated at 57. A detecting unit $D^2$ is mounted between the current brushes 55 and 56 and preferably it comprises longitudinal and transverse coils identical in all respects with the detecting unit shown in Fig. 1. Fissures which have been polarized by the electromagnets 38, 39 and 40 will ordinarily be detected by the longitudinal coils 21 and 22, although if not polarized by such means the fissures would in many instances be passed undetected. In such cases, it is the combination of the electro-inductive system of testing with the residual magnetism system which makes possible the detection of fissures which neither system alone would detect.

A third detecting unit $D^3$ is mounted at the rear of the last car section 37, where it is out of the longitudinal magnetic field set up by the residual magnetism car sections 35 and 36, and also out of the transverse magnetic field set up by the current introduced in the rail by the rear car section 37. The detector $D^3$, like the detector $D^1$, is actuated by the residual magnetism left in the vicinity of fissures and preferably it includes a longitudinal coil 59 and a transverse coil 60 similar to the transverse coils 23 and 24 of the detector $D^2$. Amplifiers 61 and 62, connecting the coils 59 and 60 to pen units 63 and 64 respectively, amplify the flaw indications for recording on a moving chart 65. There are some cases in which a transverse fissure might be missed by the detector $D^1$ and subsequently by the detector $D^2$, but would be caught by the coil 59, because of some change in the direction of fissure polarization, or the application of flux to the fissure. In the same way, the coil 60 has the opportunity of detecting fissures that may be missed by the detectors $D^1$ and $D^2$, and this is particularly true, because the transverse flux introduced into the rail by the electro-inductive car section 37 will tend to polarize vertical split heads and cause this type of fissure to be detected by the coil 60.

It will be understood that the moving record charts associated with the detectors $D^1$, $D^2$ and $D^3$ may be separate charts, or may be the same chart, and in either case, the chart or charts are preferably driven at a speed proportional to car speed.

It is not to be expected that the longitudinal coil 59 will be as efficient as the coils 44 and 45 of the detector $D^1$ in locating transverse fissures, because the electro-inductive car 37 has introduced a strong transverse flux into the rail. The same is true even though additional rail magnetizing devices similar to the electromagnets 38, 39 and 40, were disposed between the rear wheel of the electro-inductive car 37 and the detector $D^3$.

It should be understood that all explanations of phenomena herein expounded are to be considered as tentative only, because there is no definite proof which can establish without question any particular theory that may plausibly account for the superior results obtained by using the method and apparatus of this invention. For example, it may be that the electro-inductive system employed on car section 37 has improved action when used following car sections 35 and 36, because the rail is placed in a more cyclic condition due to the repeated application of magnetic flux by the magnets 38, 39, and 40. It should be understood that these magnets not only successively apply magnetic flux to the rail, after each application of which the flux is reduced to zero, but they also send a certain amount of reversed flux through the rail due to leakage flux traveling forwardly through the rail. In other words, the rail, after being subjected to the repeated maximum and minimum flux densities created by the magnets 38, 39, and 40 and the reversed flux which these magnets necessarily produce, is more responsive to magnetic flux conditions produced by the current that is passed through the rail by the car section 37.

In speaking of the various coils as transverse and longitudinal coils, it is to be understood of course that reference is made chiefly to the relative positions of the poles of the cores extending through these coils. If the disposition of the poles of one core is transverse to the rail, the coil thereon is considered a transverse coil, and if the disposition of the poles of one core is longitudinal of the rail, the coil thereon is considered a longitudinal coil.

The broad object of the invention may be achieved by the use of other detecting apparatus placed between the current brushes, and other such variations may be made within the scope of the appended claims.

I claim:

1. In apparatus for detecting flaws in metallic bodies, the combination of means for progressively passing an electrical current longitudinally through the body to set up a transverse magnetic field in the vicinity of the body, inductive means for detecting variations in said magnetic field, and means in advance of the current producing means for passing a strong, longitudinal magnetic field through the body, said inductive means including a longitudinal coil and a transverse coil.

2. In apparatus for progressively detecting flaws in metallic bodies, energizing means including front and rear current brushes for passing a relatively strong electric current longitudinally through the body to set up a transverse magnetic field in the vicinity of the body, a detector unit located between the brushes and including two pairs of induction coils, each pair being connected in opposition and one pair having their cores arranged longitudinally of the body and in contiguous relation and the other pair having their cores arranged transversely of the body and in contiguous relation, separate amplifiers for each pair of coils for increasing the impulses received by the coils when the latter traverse a flaw in the body, and means located in advance of the front current brush for introducing a strong longitudinal magnetic flux into the body for polarizing transverse fissures.

3. In apparatus for progressively detecting flaws in metallic bodies, energizing means including front and rear current brushes for passing a relatively strong electric current longitudinally through the body to set up a transverse magnetic field in the vicinity of the body, a detector unit including two pairs of induction coils, each pair being connected in series opposition and one pair having their cores arranged longitudinally of the body and positioned between the brushes, and the other pair having their cores arranged transversely of the body and also positioned between the brushes, separate amplifying means for each pair of coils for increasing the impulses received by the coils when the latter traverse a flaw in the body, and electromagnetic means located entirely in advance of the coils having longitudinal cores for introducing into the body a strong magnetic flux extending longitudinally of the body for polarizing transverse fissures.

4. In apparatus for progressively detecting flaws in metallic rails, rail energizing means including front and rear current brushes for passing a relatively strong electric current longitudinally through the rail, a detector unit including two pairs of induction coils, each pair being connected in series opposition and one pair having their cores arranged longitudinally of the rail and in the same position with respect to the brushes, and the other pair having their cores arranged transversely of the rail and between the brushes, amplifying means for increasing the impulses received by the coils when the latter traverse a flaw in the rail, and an electromagnet including an L-shaped core in advance of the coils having longitudinal cores for introducing into the rail a strong magnetic flux extending longitudinally of the rail for polarizing transverse fissures.

5. In apparatus for progressively detecting flaws in metallic rails, rail energizing means including front and rear current brushes for passing a relatively strong electric current longitudinally through the rail, a detector unit including two pairs of induction coils, each pair being connected in series opposition and one pair having their cores arranged longitudinally of the rail and in the same position with respect to the brushes, and the other pair having their cores arranged transversely of the rail and between the brushes, amplifying means for increasing the impulses received by the coils when the latter traverse a flaw in the rail, and an electromagnet including an L-shaped core in advance of the coils having longitudinal cores for introducing into the rail a strong magnetic flux extending longitudinally of the rail for polarizing transverse fissures, the leading end of the core being positioned close to the rail and the trailing end being spaced substantially from the rail, the apparatus including magnetic frame portions and a wheel engaging the rail between the magnet and the coils.

6. In apparatus for detecting flaws in rail, the combination of means for progressively sending a uni-directional flux longitudinally through the rail, a detector unit mounted in rear of said means and substantially out of its field for locating traces of residual magnetism in the vicinity of the fissures, means in rear of the detecting unit for progressively passing a relatively strong uni-directional electrical current longitudinally through the rail, and a second detecting unit positioned for cooperation with that portion of the rail through which the current is flowing, said second detector unit including both longitudinal and transverse induction coils.

7. In apparatus for detecting flaws in rail, the combination of means for progressively sending a uni-directional flux longitudinally through the rail, a detector unit mounted in rear of said means and substantially out of its field for locating traces of residual magnetism in the vicinity of the fissures, means in rear of the detecting unit for progressively passing a relatively strong uni-directional electrical current longitudinally through the rail, a second detecting unit positioned for cooperation with that portion of the rail through which the current is flowing, said second detector unit including both longitudinal and transverse induction coils, and a third detector unit mounted in rear of the means for passing current through the rail and including a transverse induction coil.

8. In apparatus for detecting flaws in rail, the combination of means for progressively sending a uni-directional flux longitudinally through the rail, a detector unit mounted in rear of said means and substantially out of its field for locating traces of residual magnetism in the vicinity of the fissures, means in rear of the detecting unit for progressively passing a relatively strong uni-directional electrical current longitudinally through the rail, a second detecting unit positioned for cooperation with that portion of the rail through which the current is flowing, said second detector unit including both longitudinal and transverse induction coils, a third detector unit mounted in rear of the means for passing current through the rail and including a transverse induction coil, and a longitudinal induction coil.

9. In apparatus for detecting flaws in rail, the combination of means for progressively applying a longitudinal magnetic flux to the rail, means for subsequently applying to portions of the rail so treated a strong uni-directional electrical current, and a detector unit cooperating with the electrified portion of the rail, said detector unit comprising a pair of contiguous longitudinal coils, and a pair of contiguous transverse coils.

10. In apparatus for detecting flaws in rail, the combination of means for progressively applying a longitudinal magnetic flux to the rail, means for subsequently applying to portions of the rail so treated a strong uni-directional electrical current, a detector unit associated with said means for passing current through the rail, said detector unit including transverse and longitudinal coils, and another detecting unit positioned in rear of the rail energizing current means and beyond the magnetic field created thereby, said last mentioned detecting unit including a transverse detector coil.

11. The method of detecting flaws in rails which consists in first passing a strong longitudinal magnetic flux through the rail, then subjecting the rail to a uni-directional electrical current passed longitudinally through the rail and simultaneously with the application of the current to the rail, detecting variations in the field produced by the current as well as the presence of polarized transverse fissures by inductive means having longitudinal and transverse cores.

12. The method of locating flaws in rail which comprises the steps of passing a strong uni-directional magnetic flux through the rail, repeating said step, then exploring the rail for the presence of residual magnetism in the vicinity of fissures, then energizing the rail with a strong uni-directional electrical current and, simultaneously with this last step detecting variations in the magnetic flux set up by the current by an induction coil positioned transversely of the rail.

13. The method of locating flaws in rail which comprises the steps of passing a strong uni-directional magnetic flux through the rail, repeating said step, then exploring the rail for the presence of residual magnetism in the vicinity of fissures, then energizing the rail with a strong uni-directional electrical current and simultaneously with this last step detecting variations in the magnetic flux set up by the current by an induction coil positioned transversely of the rail, and finally, after permitting the means for introducing current in the rail to pass beyond, detecting transverse components of residual magnetism introduced into the rail at the vicinity of fissures by said last named means.

14. The method of locating flaws in rail which comprises placing the rail in a cyclic condition by first applying a relatively strong magnetic flux to the rail, removing the source of flux and then applying another magnetic flux to the rail, removing the second source of flux, then passing a strong electric current through the rail thus treated, and finally detecting variations in the magnetic field produced by the current passing through the rail.

15. The method of detecting flaws in rails which consists in first passing a strong longitudinal magnetic flux through the rail, removing the portion of the longitudinal magnetic flux originating outside of the rail but leaving any flux caused by magnetization of the rail, then subjecting the rail to a unidirectional electrical current and simultaneously with the application of the current to the rail, detecting variations in the field produced by the current as well as the presence of polarized transverse fissures by inductive means having longitudinal and transverse cores.

16. In apparatus for progressively detecting flaws in long electrically conducting magnetizable bodies, said apparatus being adapted to be moved in a given direction along one of said bodies, the combination of means for passing a strong magnetic field longitudinally through a portion of the body, means for passing an electric current longitudinally through a portion of the body and thereby setting up a magnetic field whose lines of force lie approximately in planes perpendicular to the length of the body, and means for detecting variations in the magnetic field around the body, said first means being located entirely in advance of said last means.

17. In apparatus for progressively detecting flaws in long electrically conducting magnetizable bodies, said apparatus being adapted to be moved in a given direction along one of said bodies, the combination of means for passing a strong magnetic field longitudinally through a portion of the body, means for passing an electric current longitudinally through a portion of the body and thereby setting up a magnetic field whose lines of force lie approximately in planes perpendicular to the length of the body, and means for detecting variations in the magnetic field around the portion of the body through which said current is flowing, said first means being located entirely in advance of said second and third means.

18. In apparatus for progressively detecting flaws in long electrically conducting magnetizable bodies, said apparatus being adapted to be moved in a given direction along one of said bodies, the combination of means for passing a strong magnetic field longitudinally through a portion of the body, means for passing an electric current longitudinally through a portion of the body and thereby setting up a magnetic field whose lines of force lie approximately in planes perpendicular to the length of the body, and means for detecting variations in the magnetic field around the body, said first means being located entirely in advance of said last means, and said detecting means comprising elements responsive to variations in the longitudinal components of the magnetic field and other elements responsive only to variations in the transverse components of the magnetic field.

WALTER C. BARNES.